United States Patent [19]

Minaudo et al.

[11] Patent Number: 5,225,208
[45] Date of Patent: Jul. 6, 1993

[54] EXTRUSION DEVICE FOR PRODUCING TIRE TREAD PLIES

[75] Inventors: Diego Minaudo, Rome; Viscardo Baldoni, Acilia; Alessandro Corsi, Vitinia; Tommaso Sacco, Torvaranica, all of Italy

[73] Assignee: Bridgestone/Firestone, Inc., Akron, Ohio

[21] Appl. No.: 832,184

[22] Filed: Feb. 6, 1992

[30] Foreign Application Priority Data

Mar. 15, 1991 [IT] Italy .................. TO91A000192

[51] Int. Cl.⁵ .............................. B29C 47/02
[52] U.S. Cl. .................. 425/114; 425/188; 425/192 R; 425/461
[58] Field of Search ............ 264/176.1, 259, 261; 425/113, 114, 188, 190, 192 R, 376.1, 461, 462; 156/244.11, 244.22, 500

[56] References Cited

U.S. PATENT DOCUMENTS

| | | | |
|---|---|---|---|
| 2,453,312 | 11/1948 | Frazier | 425/114 |
| 2,514,211 | 7/1950 | Carlson | 425/190 |
| 2,560,022 | 7/1951 | Formaz | 425/190 |
| 2,607,953 | 8/1952 | Richardson et al. | 425/192 |
| 2,794,213 | 6/1957 | Davis | 425/113 |
| 3,407,441 | 10/1968 | Vigansky et al. | 425/461 |
| 3,737,262 | 6/1973 | Klein | 425/113 |
| 3,870,453 | 3/1975 | Howard | 425/466 |
| 4,316,710 | 2/1982 | Greenwood | 425/192 R |
| 4,354,814 | 10/1982 | Grimminger et al. | 425/192 R |
| 4,683,095 | 7/1987 | Tolonen et al. | 425/192 R |
| 4,799,874 | 1/1989 | Bellmer et al. | 425/192 R |

FOREIGN PATENT DOCUMENTS

| | | |
|---|---|---|
| 0191911 | 8/1986 | European Pat. Off. |
| 0270816 | 6/1988 | European Pat. Off. |
| 0330811 | 9/1989 | European Pat. Off. |
| 0339510 | 11/1989 | European Pat. Off. |
| 0381402 | 8/1990 | European Pat. Off. |
| 3506257 | 4/1986 | Fed. Rep. of Germany |
| 3739457 | 9/1988 | Fed. Rep. of Germany |

Primary Examiner—Scott Bushey
Attorney, Agent, or Firm—David A. Thomas

[57] ABSTRACT

An extrusion device (1) the extrusion head (2) of which features a number of superimposed shaped plates (9, 10, 11, 12) clamped together by a clamping device (3) located and operating externally of the extrusion head (2) about which it defines a releasable ring device; the extrusion device (1) having an automatic release device (4) for separating the shaped plates (9, 10, 11, 12) when the ring device is released.

4 Claims, 6 Drawing Sheets

EXTRUSION DEVICE FOR PRODUCING TIRE TREAD PLIES

TECHNICAL FIELD

The present invention relates to an extrusion device for producing tire tread plies.

BACKGROUND OF THE ART

In particular, the present invention relates to an extrusion device of the type comprising an extrusion head, in turn comprising a number of shaped plates, a wire or ply reinforcement guiding device and a die, and releasable clamping means for packing the plates together. When packed together, said plates define an intermediate guide duct for reinforcing wires and two supply ducts for extruded elastomeric material located on opposite sides of the guide duct, and provide for locking together the wire guiding device and the die.

In known extrusion devices of the aforementioned type, said clamping means normally comprise a number of rods fitted through said plates and having threaded end portions engaged by lock nuts which, once the plates have been packed together on a press, provide for locking them in the packed position. Said rods are usually fitted along the edges of the plates, but cannot be equally spaced to prevent interfering with the supply and guide ducts. This therefore results in uneven clamping pressure and possible distortion of the plates, in turn resulting in poor sealing and leakage of elastomeric material from the lateral surfaces of the extrusion head.

SUMMARY OF THE INVENTION

It is an object of the present invention to provide an extrusion device of the aforementioned type, designed to at least partially eliminate the aforementioned drawback.

According to the present invention, there is provided an extrusion device for producing tread plies for road vehicle tires, said device comprising an extrusion head, in turn comprising a number of shaped plates, a wire guiding device and a die; and releasable clamping means for packing said plates together; said plates, when packed, defining an intermediate guide duct for guiding reinforcing wires, and two supply ducts for supplying extruded elastomeric material located on opposite sides of said guide duct, and locking together said wire guiding device and said die; characterized in that said clamping means comprise a ring device externally surrounding said extrusion head and having a mobile segment designed to move between a clamped position, wherein said plates are packed together, and a release position.

According to a preferred embodiment of the present invention, the above extrusion device also includes a device for releasing the extrusion head; said release device including actuating means for selectively moving said plates to and from a mutually contacting position.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
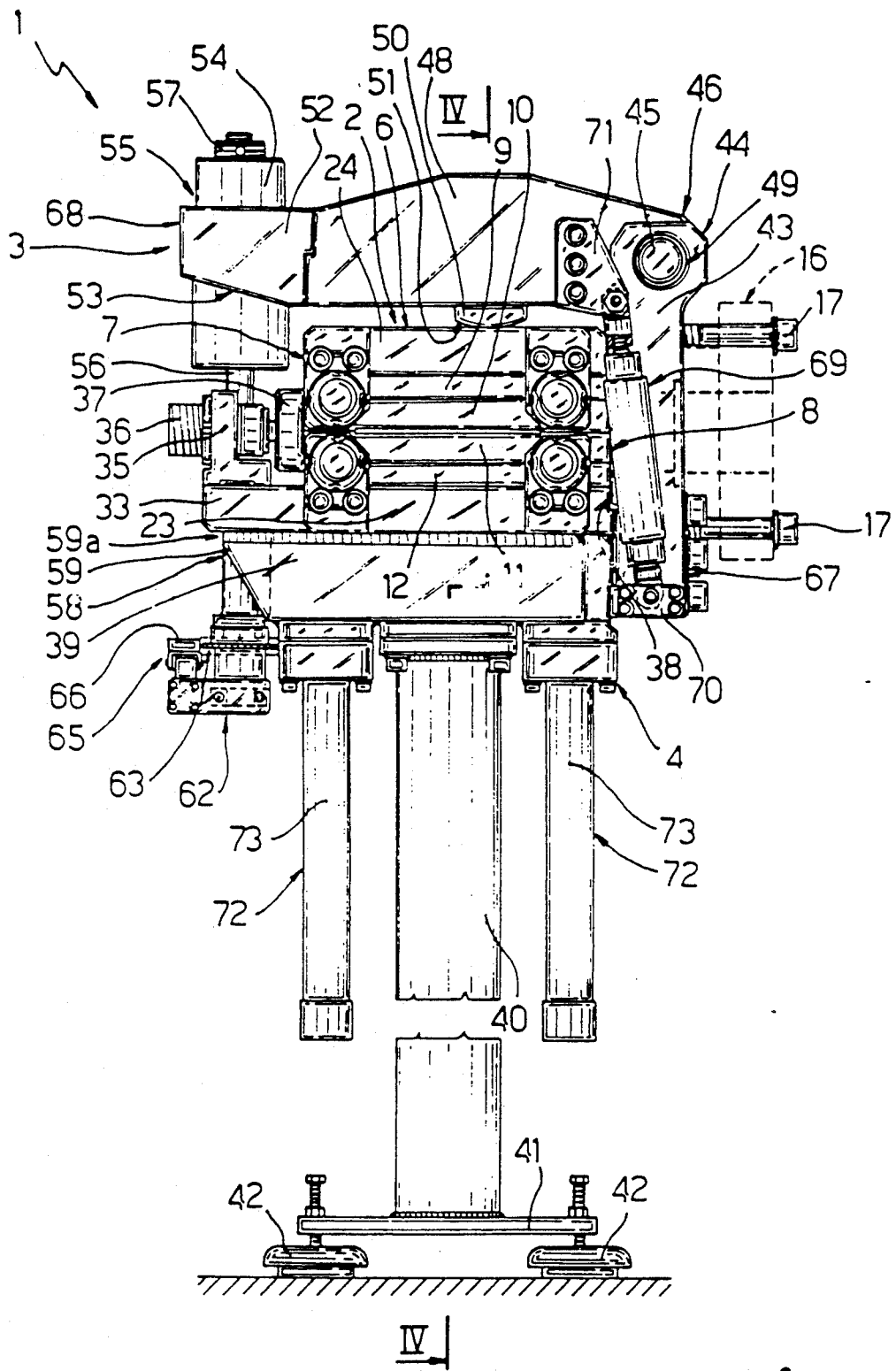
FIG. 1 shows a side view of a preferred embodiment of an extrusion device in accordance with the present invention.
Figure 2:
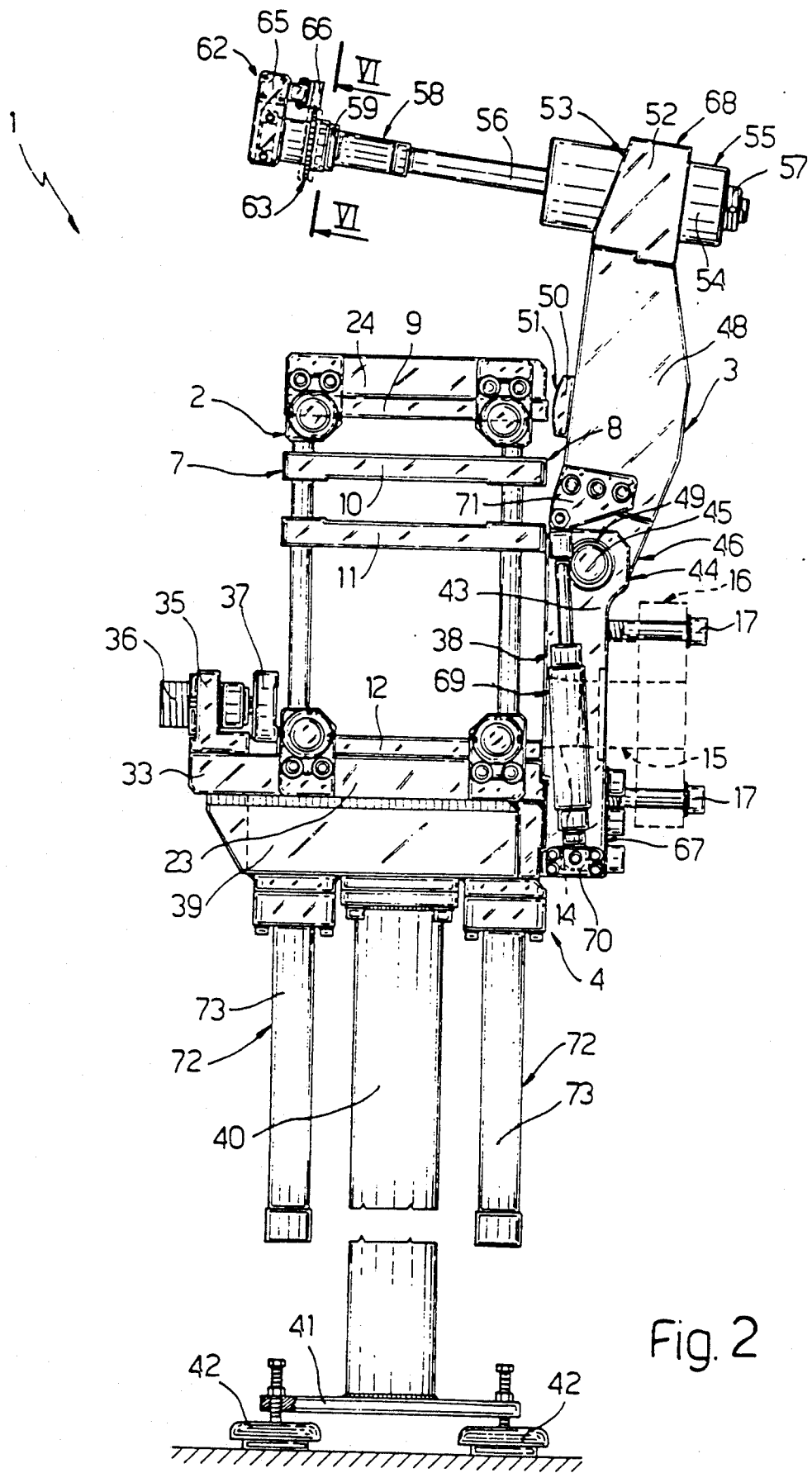
FIG. 2 shows the same side view of the FIG. 1 device in a different operating position.
Figure 3:
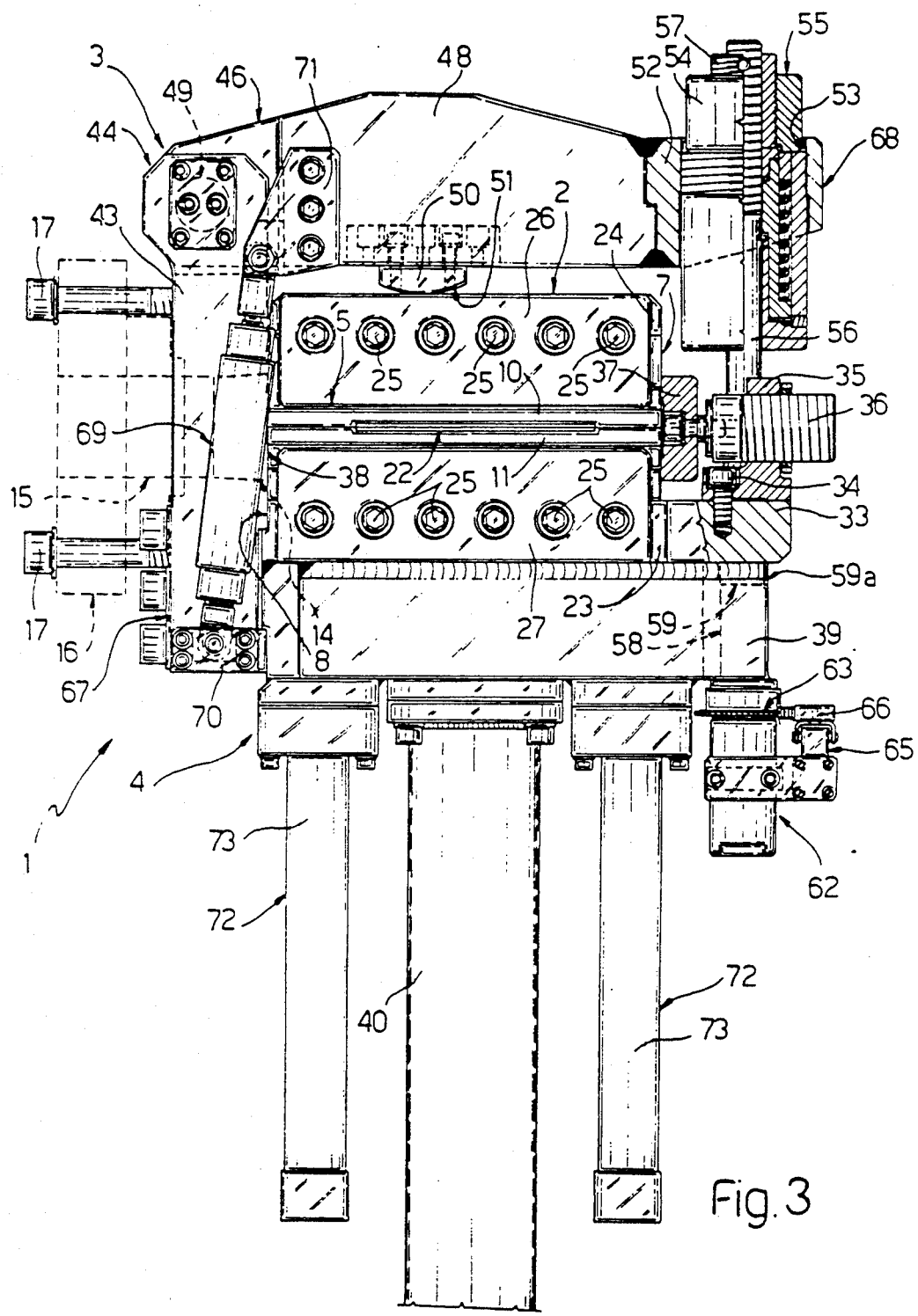
FIG. 3 shows a second larger-scale, partially-sectioned, side view of the FIG. 1 device with parts removed for simplicity.

Number 1 in FIGS. 1 to 3 indicates an extrusion device for producing tread plies (not shown) for road vehicle tires. Device 1 includes an extrusion head 2; a releasable clamping device 3 for enabling head 2 to be opened when released; and a device 4 for releasing head 2. Head 2 is substantially in the form of a rectangular parallelpipedon defined laterally by a front surface 5, a rear surface 6 and two lateral surfaces 7 and 8. Head 2 comprises four superimposed plates 9, 10, 11 and 12, of which top plate 9 and adjacent plate 10 are so shaped as to define a duct 13 having a substantially L-shaped horizontal section and the inlet end of which opens onto surface 8 to communicate with the mouth or outlet 14 (FIGS. 2 and 3) of an extruder 15 having a connecting plate 16 connected to device 1 by screws 17. Bottom plate 12 and adjacent plate 11 are so shaped as to define a duct 18 which, like duct 13, presents a substantially L-shaped horizontal section and an inlet end opening onto surface 8 to communicate with outlet 14 of extruder 15.

Adjacent plates 10 and 11 are so shaped as to define a straight duct 19, the inlet of which opens onto rear surface 6 for enabling the passage of a number of reinforcing cords (not shown) for a known type of tread ply (not shown), and in which said cords are enclosed between two layers of elastomeric material (not shown).

Figure 4:
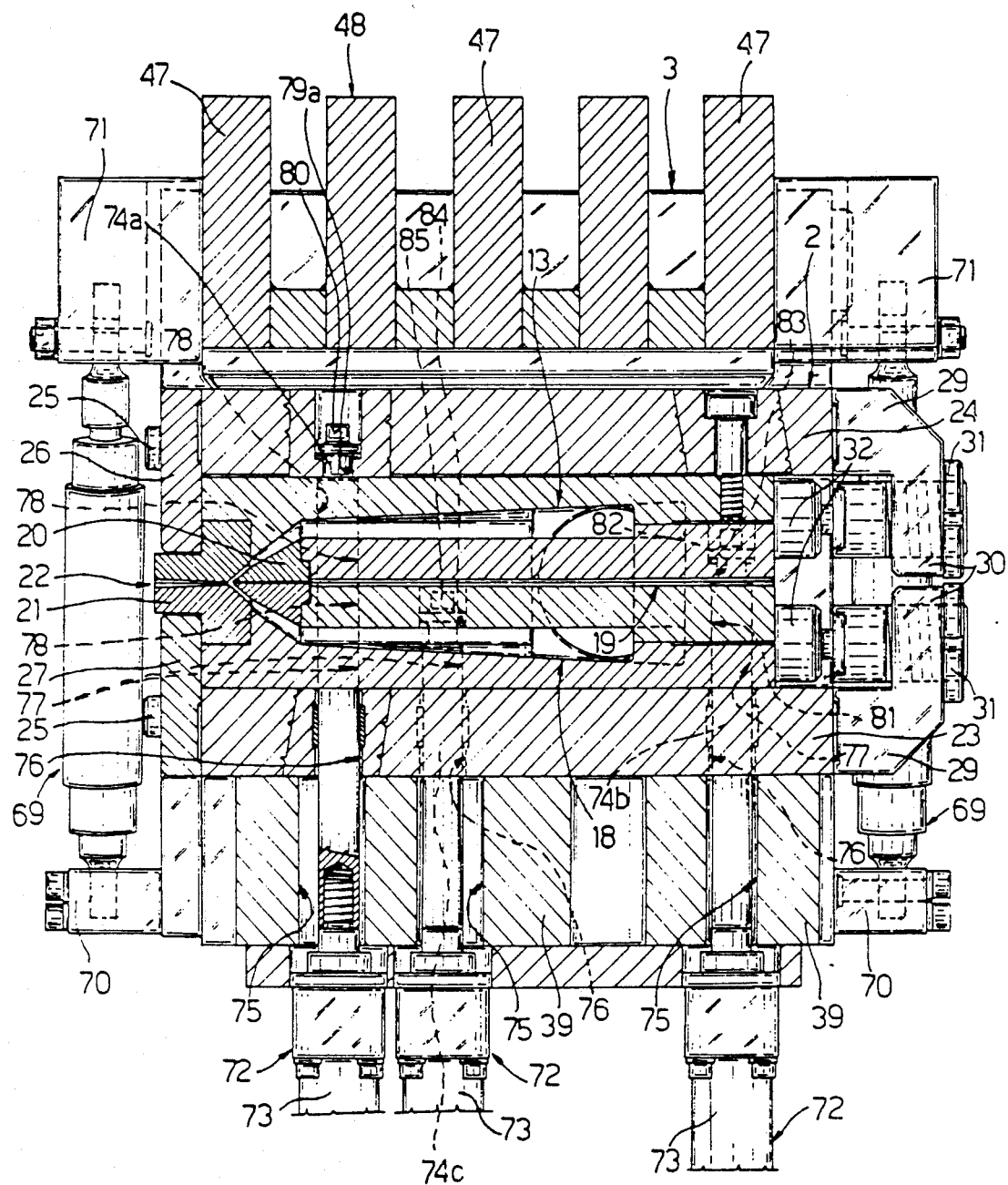
FIG. 4 shows a larger-scale section along line IV—IV in FIG. 1.
Figure 5:
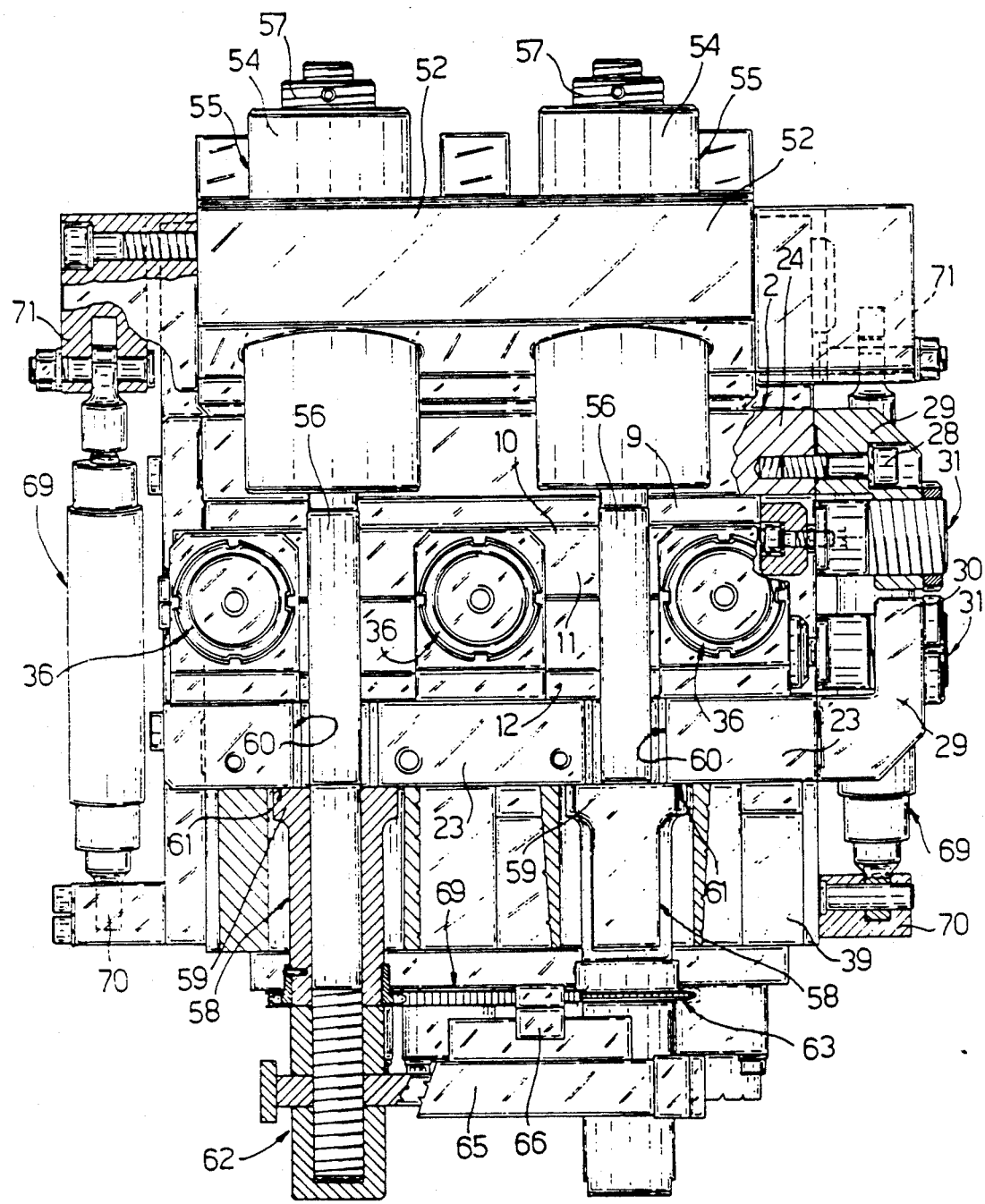
FIG. 5 shows a further larger-scale, partially-sectioned, side view of the FIG. 1 device with parts removed for simplicity.

As shown more clearly in FIG. 4, head 2 also includes a wire guiding device 20 located at the outlet of duct 19 and clamped between plates 9 and 12 for guiding said cords to the inlet of a die 21 forming part of head 2. Die 21 is located between plates 9 and 12, in front of wire guiding device 20, for receiving said cords and two layers of elastomeric material from ducts 13 and 18, and feeding them together to a mouth or die outlet 22 located ahead of front surface 5 of head 2. Head 2 also includes a bottom plate 23 supporting and contacting the bottom surface of plate 12; and a top plate 24 contacting the top surface of and connected integral with plate 9 by screws 25. By means of screws 25, plates 24 and 23 are fitted on their front ends with respective horizontal gibs 26 and 27 defining a front contact surface for die 21 and an opening for the passage of die outlet 22.

By means of screws 28, each plate 23 and 24 is fitted on the rear end with two substantially L-shaped brackets 29, each having an arm 30 extending vertically towards arm 30 of another bracket 29 to define an opening aligned with the inlet of duct 19. Each arm 30 supports an actuator 31 having a pusher, or piston 32 elastically or yieldingly engageable with and hydraulically detachable from rear surface 6 of head 2. As shown more clearly in FIG. 4, each piston 32 on bracket 29 connected to plate 23 engages plates 11 and 12, while each piston 32 on brackets 29 connected to plate 24 engages plates 9 and 10, so as to clamp plates 9 to 12, wire guiding device 20 and die 21 against the vertical shoulder defined by gibs 26 and 27.

As shown in FIG. 3, from a lateral surface of plate 23, substantially coincident with surface 7, there projects a lateral appendix 33 fitted, by means of screws 34, with an elongated plate 35 facing surface 7. Plate 35 supports three actuators 36, each presenting a pusher or piston 37 elastically or yieldingly engageable with and hydraulically detachable from surface 7. Actuators 36 provide for clamping plates 9 to 12, wire guiding device 20 and die 21 against a shoulder surface 38 facing surface 8, to be described in more detail later. The function of actuators 36 is to provide for sealing between outlet 14 of extruder 15 and the inlet of ducts 13 and 18.

Clamping device 3 includes a plate or base 39 supporting head 2 and connected to the top end of a column 40 having a base 41 supported on adjustable feet 42. Clamping device 3 also includes an upright 43 connected integrally with a lateral surface of base 39 and extending upwardly from base 39 and outwardly of head 2, so as to define, with its lateral surface facing head 2, said shoulder surface 38.

Upright 43 presents a central opening for the passage of outlet 14 of extruder 15, the screws 17 of which are fitted directly to upright 43, which projects over plate 24 when head 2 is in the closed position, i.e., with all its plates contacting one another. Upright 43 presents a top end portion consisting of a multiple fork 44 fitted through with a substantially horizontal pin 45 perpendicular to surface 5, and engaged by end appendices 46 of respective longitudinal ribs 47 of a crosspiece 48. Pin 45 fits through appendices 46 and defines, together with appendices 46 and multiple fork 44, a hinge 49 connecting crosspiece 48 to the top of upright 43.

Crosspiece 48 extends over plate 24 when head 2 is in the closed position, and, on the surface facing plate 24, is fitted integral with a pressure bar 50 parallel to pin 45 and having, at the bottom, a convex surface 51 contacting the top surface of plate 24.

The end of crosspiece 48, opposite to that connected to pin 45, is defined by a solid bar 52 having two through holes 53 perpendicular to the axis of pressure bar 50, each being engaged by the cylindrical body 54 of a hydraulic actuator 55 having a through output rod 56. The threaded top end of each rod 56 is engaged by a ring nut 57 for axially locking rod 56 in any position within a given range in relation to respective body 54.

Figure 6:
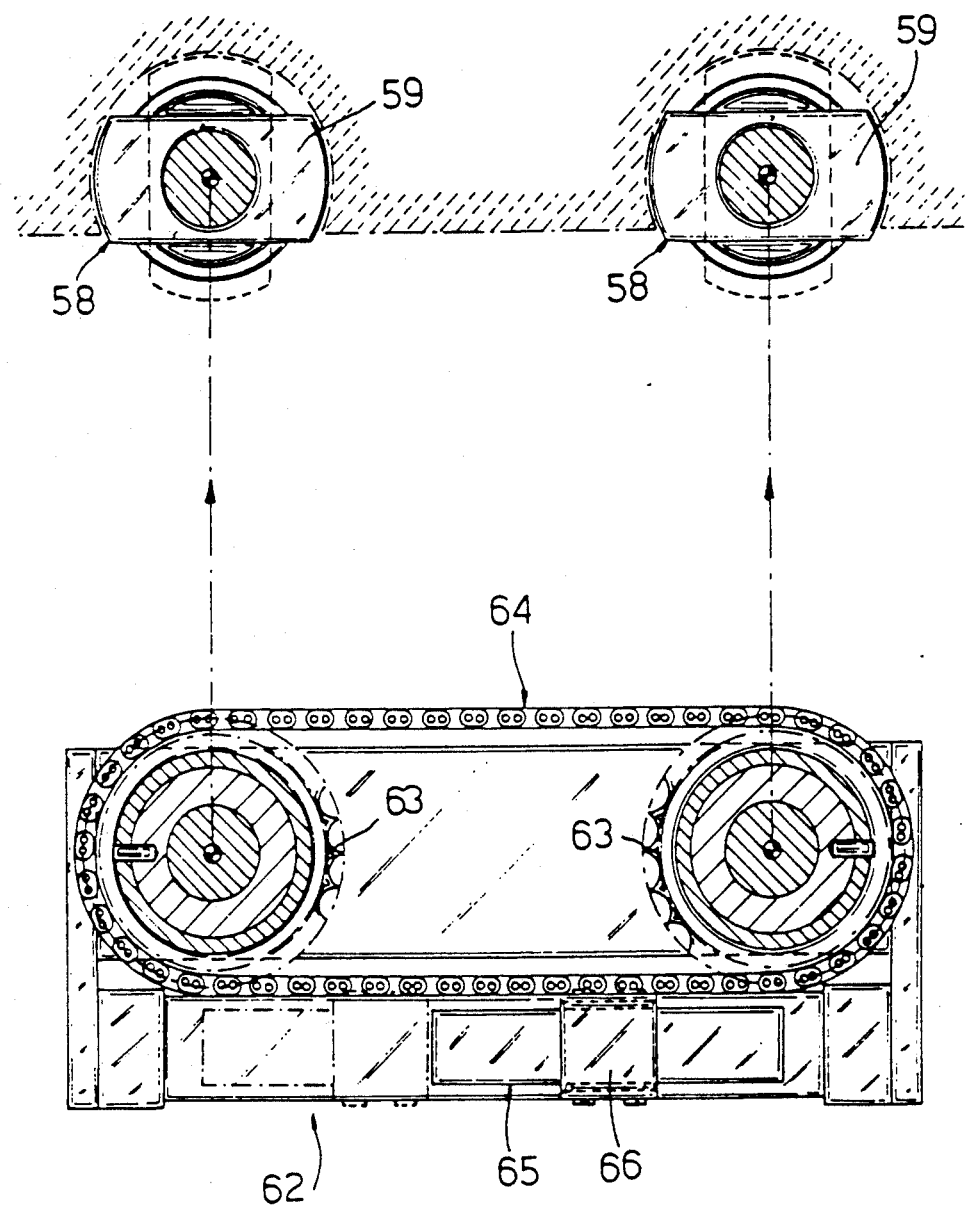
FIG. 6 shows a working section along line VI—VI in FIG. 2.

An intermediate portion of each rod 56 supports, in a rotary manner, a hammer 58 locked axially on rod 56 by means of a cap nut and having a head 59 of substantially rectangular section in a plane perpendicular to rod 56, as shown in FIG. 6. In use, a portion of each rod 56 extending between head 59 of respective hammer 58 and respective body 54 engages a lateral seat 60 formed in an outer lateral surface of appendix 33 parallel to surface 7 and having a substantially circular section, the diameter of which is less than the length of the longer axis and greater than the length of the shorter axis of head 59 of respective hammer 58. Consequently, when rods 56 engage respective seats 60, heads 59 are set to the locked position with their longer axes parallel to pin 45, and hydraulic actuators 55 are operated for raising rods 56, heads 59 of hammers 58 engage the bottom surface 61 of appendix 33 so as to lower crosspiece 48 and apply the required clamping pressure on head 2 via pressure bar 50.

Each head 59 therefore defines, with surface 61, a releasable bayonet joint 59a for connecting respective rods 56 and base 39. Joints 59a are released, i.e., heads 59 are rotated from said locked position to the release position, wherein hammers 58 are positioned with their shorter axes parallel to pin 45, by means of a rotation device 62 connected to a free end portion of rods 56 and comprising, for each rod 56, a gear 63 fitted to respective hammer 58, a chain 64 looped about the two gears 63, and an actuating device 65 located between the two rods 56 and having an output member 66 connected to one point of chain 64 for moving it one way or the other and rotating hammers 58 about the axes of respective rods 56 and between said locked and release positions.

When positioned, clamping head 2, clamping device 3 defined by base 39, upright 43, crosspiece 48 and the two actuators 55 therefore present a ring structure in which are distinguishable a fixed element 67, consisting of base 39 and upright 43, and a mobile element 68 consisting of crosspiece 48 and actuators 55 and movable between the FIG. 1 locked position and the FIG. 2 release position by virtue of two hydraulic jacks 69, each having a first end connected by a bracket 70 to the bottom end of upright 43, and a second end connected by a bracket 71 near the rear end of crosspiece 48.

As shown, particularly in FIG. 4, release device 4 comprises six hydraulic jacks 72, each comprising a body 73 connected to the bottom surface of base 39, and an output rod 74 extending upwards from respective body 73 through a respective hole 75 formed through base 39, a hole 76 formed through plate 23, and a hole 77 formed through plate 12.

Each of rods 74a in a first pair of rods 74 (only one of which is shown in FIG. 4) extends upwardly through holes 78 formed in plate 11, 10 and 9, and presents a small-diameter threaded end portion engaging a hole 79 formed through plate 24 with which rod 74a is connected integrally by means of nut 80.

Each of rods 74b in a second pair of rods 74 (only one of which is shown in FIG. 4) extends upwardly through a hole 81 formed in plate 11, and presents a small-diameter threaded end portion engaging a hole 82 formed through plate 10 with which rod 74b is connected integrally by means of nut 83.

Each of rods 74c in a third pair of rods 74 (only one of which is shown in FIG. 4) presents a small-diameter threaded end portion engaging a hole 84 formed through plate 11 with which rod 74c is connected integrally by means of nut 85.

Operation of clamping and release devices 3 and 4 will be described as of the clamped operating position shown in FIG. 1.

For cleaning and/or servicing head 2, hydraulic actuators 55 are operated for raising rods 56 and releasing the pressure on ring nuts 57. Ring nuts 57 are then unscrewed, actuators 55 de-activated, and rotation device 62 operated for rotating hammers 58 into the release position wherein heads 59 are positioned with the longer axis perpendicular to pin 45 (as shown by the dotted line in FIG. 6).

Jacks 69 may now be operated for rotating mobile element 68 about the axis of pin 45 and into the released position shown in FIG. 2, wherein crosspiece 48 is positioned substantially along the extension of upright 43 or, at any rate, to the side of head 2.

At this point, hydraulic jacks 72 may be operated for raising rods 74a, 74b and 74c in the required sequence and so raising, firstly, plates 9 and 24 for cleaning duct 18; secondly, plate 10 for cleaning duct 19 and removing, cleaning and servicing wire guiding device 20 and die 21; and, lastly, plate 11 for cleaning duct 19. Plates 9, 10 and 11 are raisable by virtue of actuators 31 and 36 being permanently activated for overcoming the thrust exerted by the respective springs and so detaching pistons 32 and 37 from head 2.

To reset device 1 to the FIG. 1 operating position, jacks 72 are operated for lowering plates 24, 9, 10 and 11 into contact with one another, after first reassembling wire guiding device 20 and die 21 after lowering plate 11. The transverse position of head 2 so formed is adjusted against gibs 27 and shoulder surface 38 by temporarily de-activating actuators 31 and 36. Jacks 69 are then operated for setting mobile element 68 to the clamped position, wherein rods 56 engage respective seats 60, and hammers 58 are positioned with heads 59 below surface 61.

Via rotating device 62, heads 59 are rotated into the clamped position shown by the continuous line in FIG. 6, and actuators 55 are operated for exerting the required compacting pressure on head 59 via crosspiece 48 and bar 50. Once the required pressure is reached, the operating position shown in FIG. 1 is achieved by tightening ring nuts 57 for axially locking rods 56 and enabling de-activation of actuators 55.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

We claim:

1. An extrusion device for producing tire tread plies, said device comprising an extrusion head, said head further comprising a number of shaped plates, a ply reinforcement guiding device and a die; and releasable clamping means for packing said plates together; said plates, when packed, defining an intermediate guide duct for guiding said ply reinforcements, and two supply ducts for supplying extruded elastomeric material located on opposite sides of said guide duct, and locking together said wire guiding device and said die; wherein said clamping means comprises a ring device externally surrounding said extrusion head, said ring device comprising a mobile segment designed to move between a clamped position, wherein said plates are packed together, and a release position; a device for releasing said extrusion head; said release device comprising means for selectively moving said plates to and from a mutually contacting position; said ring device including pressure means for exerting a predetermined compacting pressure on said plates; said ring device further including a fixed element, said fixed element further having a base supporting said extrusion head and an upright located on a side of said extrusion head and integral with said base; said mobile segment being connected to said upright so as to rotate in relation to said upright between a clamped position, wherein said mobile segment is connected to said base, and a release position wherein said mobile segment is detached from said base.

2. A device as claimed in claim 1, wherein said mobile segment includes a crosspiece hinged at one end to said upright and designed to move in relation to said upright to and from one end of said extrusion head and between clamped position, wherein said crosspiece exerts said compacting pressure on said extrusion head, and a release position wherein said crosspiece is positioned to the side of said extrusion head.

3. A device as claimed in claim 2, wherein said mobile segment also includes said pressure means, which is connected to the end of said crosspiece opposite to that connected to said upright; said pressure means being connectable to said base via releasable connecting means.

4. A device as claimed in claim 3, wherein said releasable connecting means comprise a bayonet joint.

* * * * *